US008386652B2

(12) United States Patent
Yew

(10) Patent No.: US 8,386,652 B2
(45) Date of Patent: Feb. 26, 2013

(54) MOBILE COMPUTING DEVICE WITH ADAPTIVE RESPONSE BASED ON ACCESSORY FIRMWARE

(75) Inventor: Jason Yew, San Jose, CA (US)

(73) Assignee: Apple Inc., Cupertino, CA (US)

( * ) Notice: Subject to any disclaimer, the term of this patent is extended or adjusted under 35 U.S.C. 154(b) by 362 days.

(21) Appl. No.: 12/944,987

(22) Filed: Nov. 12, 2010

(65) Prior Publication Data

US 2012/0124244 A1    May 17, 2012

(51) Int. Cl.
*G06F 3/00* (2006.01)
(52) U.S. Cl. .................... 710/7; 710/15; 710/16
(58) Field of Classification Search .......... None
See application file for complete search history.

(56) References Cited

U.S. PATENT DOCUMENTS 7,243,347 B2 *    7/2007   Palmer et al. ............. 717/170

* cited by examiner

*Primary Examiner* — Idriss N Alrobaye
*Assistant Examiner* — Richard B Franklin
(74) *Attorney, Agent, or Firm* — Kilpatrick Townsend & Stockton LLP

(57) ABSTRACT

Techniques for predicting accessory behavior and techniques for responding based on the predicted behavior are provided. A mobile computing device (MCD) determines firmware being used by an accessory. Based on the determination, the MCD can predict a command most likely to be received next from the accessory. After the MCD determines the command most likely to be received next from the accessory, the MCD can retrieve the information to be sent in response to the command and/or initiate an operation to be performed in response to the command prior to actually receiving the command from the accessory.

25 Claims, 9 Drawing Sheets

MOBILE COMPUTING DEVICE WITH ADAPTIVE RESPONSE BASED ON ACCESSORY FIRMWARE

BACKGROUND

The present disclosure relates generally to mobile computing devices and in particular to techniques for predicting accessory behavior by a mobile computing device and responding to the accessory based on the prediction.

A mobile computing device (MCD) can store media assets, such as audio tracks, video tracks or photos that can be played or displayed on the mobile computing device. Examples of mobile computing devices are the iPad, the iPod®, and the iPhone™ mobile computing devices, which are available from Apple Inc. of Cupertino, Calif.

A mobile computing device can include one or more connectors or ports that can be used to interface with other devices. For example, the connector or port can enable the mobile computing device to couple to a host computer, be inserted into a docking system, or receive an accessory device. In the case of the iPod®, e.g., a vast array of accessory devices have been developed that can interconnect to the mobile computing device.

Mobile computing devices commonly connect with accessories for playback or presentation of tracks stored on the mobile computing device. A user can dock a mobile computing device to a home stereo system, for example, and play back songs stored on the mobile computing device but with sound experience provided by the home stereo system. Some accessories provide a graphical user interface (GUI) and allow the user to perform more advanced functions such as browsing a database of stored content, selecting content to play, etc.

SUMMARY

Certain embodiments of the present invention relate to predicting accessory behavior and responding to the accessory based on the prediction. A mobile computing device can determine what firmware is being executed by the accessory based on the identification information and commands received by the mobile computing device when an accessory is connected to the mobile computing device. Thereafter, based on information stored in a predictive analytics data store, the mobile computing device can determine which command is most likely to be received next from the accessory. The mobile computing device can then pre-fetch information to be sent in response to that command before the command is received by the mobile computing device.

Embodiments of the present invention provide techniques for anticipating commands that may be received from an accessory and preparing information to be sent in response to those commands before the commands are received. A mobile computing device can determine firmware being executed by an accessory and commands supported by the firmware. Based on that information, the mobile computing device can pre-fetch information and/or resources or initiate operations associated with future commands even before the commands are actually received by the mobile computing device.

Some embodiments of the present invention provide techniques for determining firmware being used by an accessory. A mobile computing device can receive a sequence of identification commands from an accessory. The mobile computing device can analyze the sequence of identification commands to identify one or more characteristics indicative of firmware being used by the accessory. Some of the characteristics can include a specific order of information provided in the sequence of identification commands, time between successive commands in the sequence of identification commands, total time elapsed for receiving the sequence of identification commands, and type of identification commands received from the accessory. Based on the identification of the firmware, the mobile computing device can determine various commands supported by that firmware version. The mobile computing device can generate a predictive analytics data tree that maps the various commands, their sequence, and the associations between them. In addition, the predictive analytics data tree can also include information about a probability that a particular command will be received next after another command. A different predictive analytics data tree can be generated for each firmware version.

The following detailed description, together with the accompanying drawings will provide a better understanding of the nature and advantages of the present invention.

DETAILED DESCRIPTION

Embodiments of the present invention relate to techniques for predicting accessory behavior and responding based on the prediction. Every accessory that is designed to interact with a mobile computing device communicates with the mobile computing device using one or more commands. The commands used by an accessory generally depend on the firmware version used by the accessory and the type of accessory. In other words, every firmware version executed by an accessory supports a specific set of commands. When an accessory is coupled to a mobile computing device, the accessory can initially identify itself to the mobile computing device and go through an authentication process before any data is exchanged between the accessory and the mobile computing device. In some embodiments, the mobile computing device can determine a firmware version of the accessory during this initial identification/authentication process. In an embodiment, the mobile computing device can analyze certain characteristics associated with the identification/authentication commands to determine the firmware version. In other embodiments, the accessory can provide the firmware version information to the mobile computing device.

In some embodiments, the mobile computing device can generate a predictive analytics data tree for each firmware version. The predictive analytics data tree can include information for various commands supported by the firmware version and the temporal relationship between those commands. For example, the predictive analytics data tree can include information that indicates which command follows which other command(s) and which command precedes which other command(s). The predictive analytics data tree can also include information indicating the probability that a particular command will immediately follow a command. Please note that "immediately follow" and "temporal" in this context means that the particular command is received next after the command. "Immediately follow" in this specification is not being used to define time period between two successive commands.

In some embodiments of the present invention, a mobile computing device can determine a firmware version being used by the accessory. Based on that information, the mobile computing device can determine the commands supported by that firmware version. The mobile computing device can then determine which command is most likely to be received next from the accessory based on information in the predictive analytics data tree corresponding to the firmware version and a currently received command. Based on that determination, the mobile computing device can pre-fetch information to be sent in response to the determined command or initiate an operation associated with the determined command.

Figure 1:
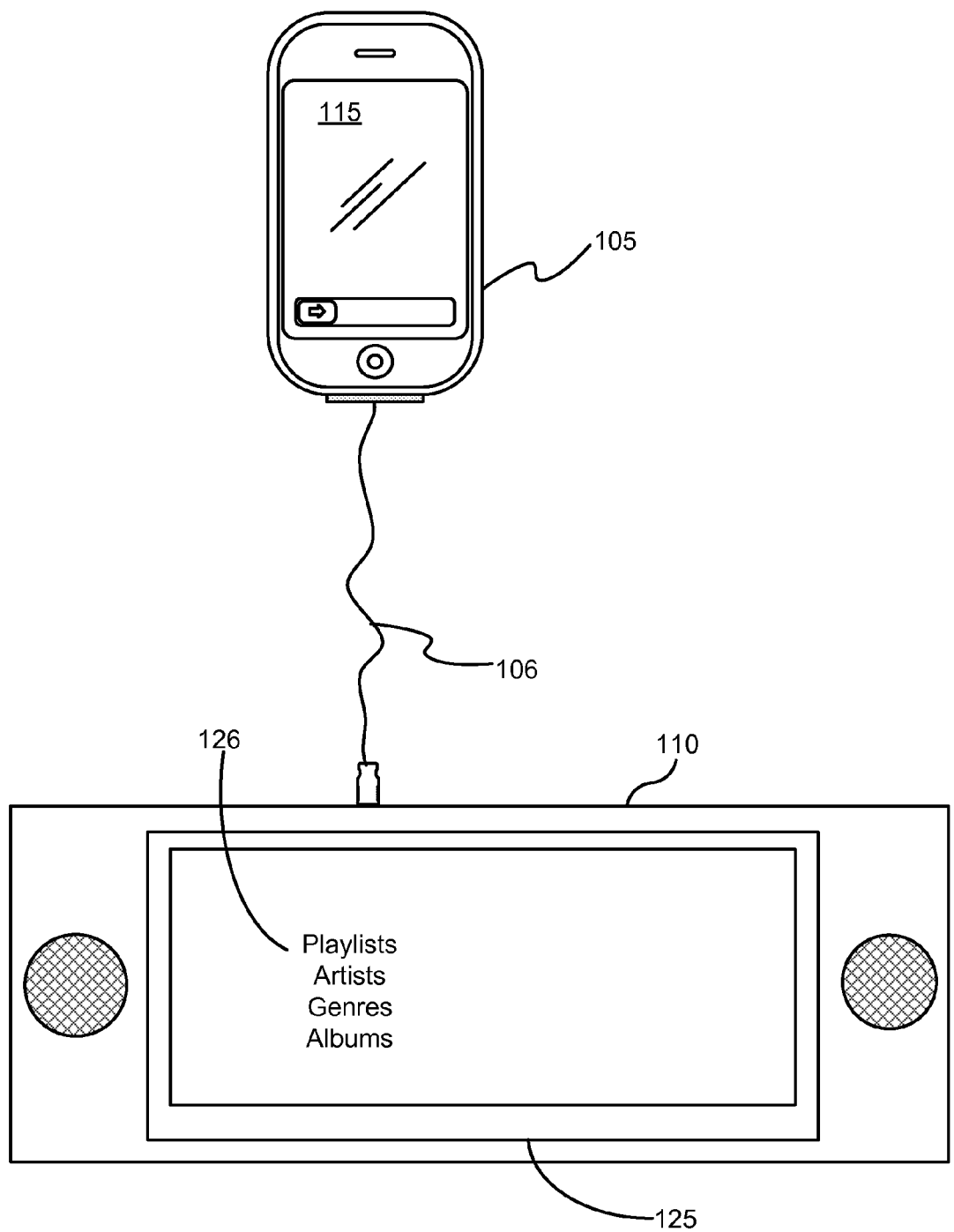
FIG. 1 is an illustration of an accessory connected to a mobile computing device according to an embodiment of the present invention.

FIG. 1 illustrates mobile computing device (MCD) 105. MCD 105 can be docked to accessory 110, e.g., a home entertainment system or an in-vehicle media unit, in an embodiment of the present invention. The docking of MCD 105 to accessory 110 can be achieved in various ways, e.g., direct connection between mating connectors of MCD 105 and accessory 110 (not shown), indirect connection using cable 106 as shown, wireless connection, physical placement of MCD 105 in an opening in accessory 110, or the like. A playlist (or other listing of media assets) can be viewable in MCD display 115. Subsequent to docking, the same playlist can be viewable on accessory display 125. In one embodiment, accessory display 125 can include information display section 126. Information display section 126 can display information related to media assets, in addition to other information. Accessory 110 can include an internal controller device to manage various functions of the accessory including communications with MCD 105.

MCD 105 can have multiple media assets stored in a media asset data store resident on an internal storage device (not shown). The multiple media assets may be categorized into various categories, which can be arranged hierarchically in the media asset data store to facilitate database navigation or browsing. In addition, MCD 105 can have a predictive analytics data store resident on the internal storage, which can include one or more predictive analytics data trees that include information about commands supported by various firmware versions and temporal relationship between commands supported by a particular firmware version.

Accessory 110 can support a version of firmware selected by the accessory manufacturer. Firmware used by accessory 110 may depend in part on the functionality offered by the accessory. For example, an accessory that supports only audio functions can use a different firmware version than an accessory that supports audio and video functions. In some embodiments, multiple accessories can use the same firmware version; however, an accessory can only execute a single firmware version at any given time. Each firmware version can use a specific set of commands that are used to exchange information with the MCD. For example, firmware for an audio-only accessory need not support commands related to exchanging video information.

For example, accessory 110 can be a car stereo head unit that can connect to MCD 105 and provide a user interface that allows a user to interact with MCD 105 using display 126. When MCD 105 is connected to accessory 110, the firmware in the accessory can initiate the identification and authentication sequence. Accessory 110 may need information about media assets and related data stored in MCD 105 to present a database navigation interface to the user. In order to request and receive this data, accessory 110 sends to and receives from MCD 105 multiple commands once the identification and authentication process has successfully completed. MCD 105 does not control the order in which the data will be requested by accessory 110 since the requests are controlled by the accessory firmware. Some data requested by accessory 110 may require significant time for retrieval from MCD 105. In such instances, it would be helpful if the MCD "knew" or could predict in advance which information the accessory is likely to request next. This can enable the MCD to respond faster to a request from the accessory by retrieving the information prior to the request being received.

Embodiments of the present invention provide techniques whereby MCD 105 can predict what action accessory 110 will take next and then prepare for responding to that action even before the accessory actually performs the action. In some embodiments, the action may be sending a request for retrieving information or sending a request to perform an operation.

Figure 2:
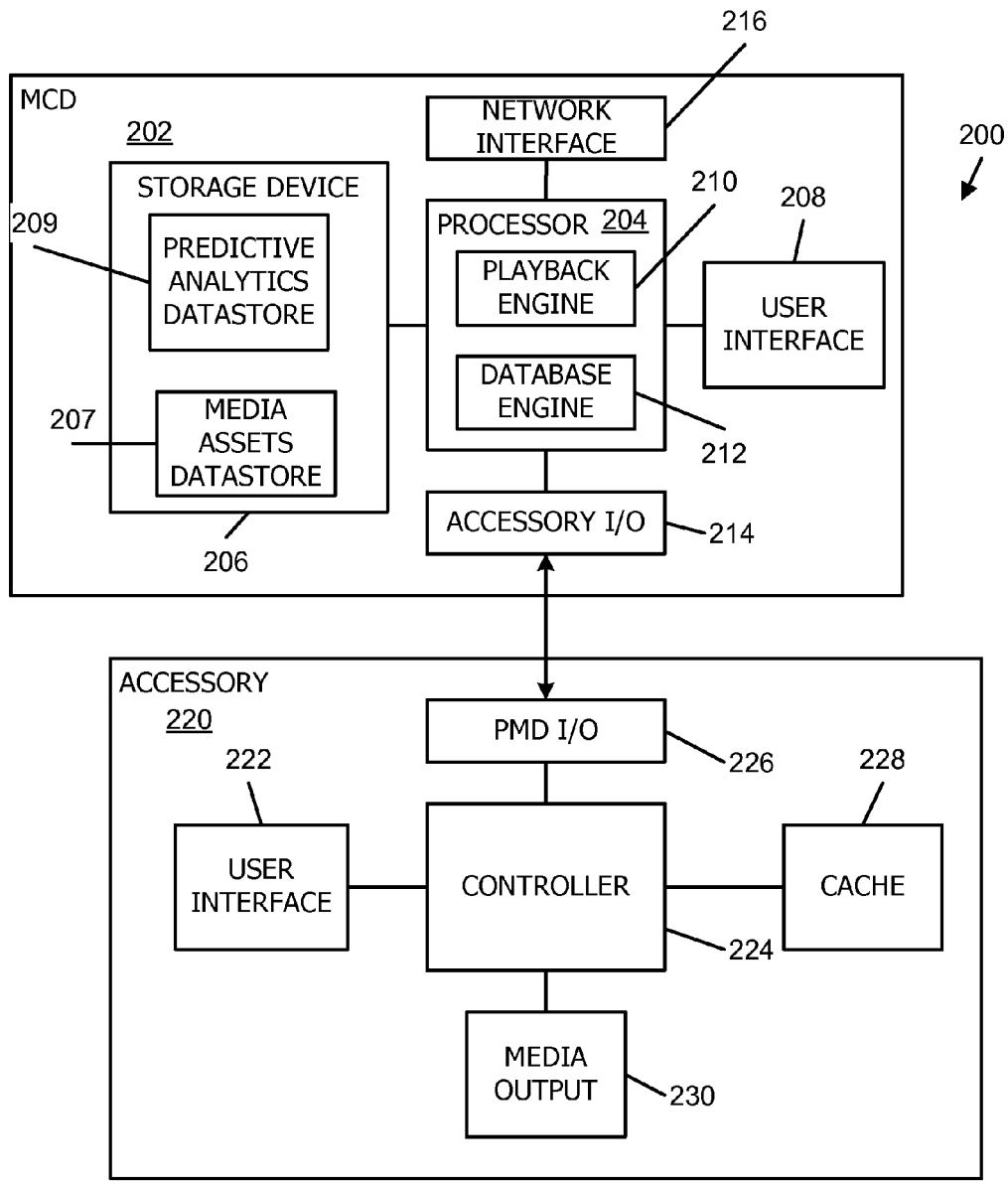
FIG. 2 is a block diagram of a mobile computing device and an accessory according to an embodiment of the present invention.

FIG. 2 is a block diagram of system 200 according to an embodiment of the present invention. System 200 can include MCD 202 (e.g., implementing MCD 105 of FIG. 1) and an accessory 220 (e.g., implementing accessory 110 of FIG. 1).

MCD 202 in this embodiment can provide media device capability. MCD 202 can include processor 204, storage device 206, user interface 208, and accessory input/output (I/O) interface 214. Processor 204 in this embodiment can implement playback engine 210 and database engine 212, e.g., as software programs executed by processor 204. MCD 202 can execute programs that determine a command most likely to be received from the accessory and pre-fetch the information to be sent or initiate other operations in response to that command.

Storage device 206 can be implemented, e.g., using disk, flash memory, or any other non-volatile storage medium. In some embodiments, storage device 206 can implement a media asset data store 207 that stores media assets and also stores metadata records associated with each media asset. The metadata record for a given asset can include various fields, e.g., a media type (audio track, video track, audio book, still image, etc.); an asset title; a name of an artist or performer associated with the asset; composer or author information; asset length; chapter information; album information; lyrics; information about associated artwork or images; description of the asset; and so on. Media asset data store 207 can also include "playlists", which are lists of media assets that can be played sequentially by playback engine 210. Playlists can include user-created playlists and/or automatically generated playlists.

Storage device 206 can also include a predictive analytics data store 209 that can include one or more predictive analytics data trees. Predictive analytics data store 209 can include information about determining firmware version of the accessory. For example, predictive analytics data store 209 can include correlation information between one or more characteristics of the commands exchanged during the identification and authentication process and a corresponding firmware version. Predictive analytics data store 209 can also include information about likely command sequences for one or more firmware versions. The likely command sequences can be based on past interaction with accessories using those firmware version. Predictive analytics data store 209 can also include command identifiers for the various commands in the command sequences, resources needed in response to the commands and/or operations to be performed in response to the commands.

Storage device 206 can also store other information such as information about a user's contacts (names, addresses, phone numbers, etc.); scheduled appointments and events; notes; and/or other personal information. In still other embodiments, storage device 206 can store one or more programs to be executed by processor 204 (e.g., video game programs, personal information management programs, programs implementing playback engine 210 and/or database engine 212, etc.).

User interface 208 can include input controls such as a touch pad, touch screen, scroll wheel, click wheel, dial, button, keypad, microphone, or the like, as well as output devices such as video screen, indicator lights, speakers, headphone jacks or the like, together with supporting electronics (e.g., digital-to-analog or analog-to-digital converters, signal processors or the like). A user can operate the various input controls of user interface 208 to invoke the functionality of MCD 202 and can view and/or hear output from MCD 202 via user interface 208.

Processor 204, which can be implemented as one or more integrated circuits (e.g., a conventional microprocessor or microcontroller), can control the operation of MCD 202. For example, in response to user input signals provided by user interface 208, processor 204 can operate database engine 212 to navigate media assets database 207 stored in storage device 206 in response to user input and can display lists of selected media assets using some or all of the associated metadata to identify each selected media asset. Database navigation can be hierarchical and based on categories (which can be part of metadata associated with each media asset). Playback engine 210 can play a media asset or a playlist of media assets; media assets to be played can be selected by the user interacting with database engine 212. In some embodiments, processor 204 can communicate with predictive analytics data store 209 to determine likely future accessory behavior. In addition, processor 204 can also initiate various actions in preparation for likely future behavior, such as retrieving information that accessory 220 is likely to request from media asset data store 207.

Accessory I/O interface 214 can allow MCD 202 to communicate with various accessories. For example, accessory I/O interface 214 might support connections to an external speaker dock, a radio (e.g., FM, AM and/or satellite) tuner, an in-vehicle entertainment system, an external video device, or the like. In one embodiment, accessory I/O interface 214 includes a 30-pin connector corresponding to the connector used on iPod® products manufactured and sold by Apple Inc. Alternatively or additionally, accessory I/O interface 214 can include a different connector and/or wireless interface (e.g., Bluetooth or the like).

Network interface 216 can allow MCD 202 to communicate with other devices on a network and exchange information with the other devices. In some embodiments network interface 216 can include radio frequency (RF) transceiver components for accessing wireless voice and/or data networks (e.g., using cellular telephone technology, advanced data network technology such as 3G or EDGE, Wi-Fi (IEEE 802.11 family standards), or other mobile communication technologies, or any combination thereof), GPS receiver components, and/or other components. In some embodiments network interface 216 can provide wired network connectivity (e.g., Ethernet) in addition to or instead of a wireless interface. Network interface 216 can be implemented using a combination of hardware (e.g., antennas, modulators/demodulators, encoders/decoders, and other analog and/or digital signal processing circuits) and software components.

In some embodiments, MCD 202 can use network interface 216 or accessory I/O interface 214 to communicate with a host computer (not explicitly shown) that executes a media asset management program (such as the iTunes® media asset management program distributed by Apple Inc.). The media asset management program can enable a user to add media assets to MCD 202 and/or remove media assets from MCD 202. The user can also update the metadata associated with the media assets on MCD 202. In some embodiments, the user can also interact with the media asset management program to create and update the playlists. In one embodiment, the host computer maintains a master database of media assets (including associated metadata and playlists), and the media asset management program synchronizes the master database with media asset data store 207 maintained on storage device 206 of MCD 202 automatically whenever MCD 202 connects to the host computer.

Accessory 220 includes controller 224, user interface 222, MCD I/O interface 226, cache 228, and media output device 230. Controller 224 can include, e.g., a microprocessor or microcontroller executing program code to perform various functions such as digital audio decoding, analog or digital audio and/or video processing, and the like. User interface 222 can include input controls such as a touch pad, touch screen, scroll wheel, click wheel, dial, button, keypad, microphone, or the like, as well as output devices such as video screen, indicator lights, speakers, headphone jacks or the like, together with supporting electronics (e.g., digital-to-analog or analog-to-digital converters, signal processors or the like). Alternatively, output components of user interface 222 can be integrated with media output device 230. A user can operate the various input controls of user interface 222 to invoke the functionality of accessory 220 and can view and/or hear output from accessory 220 via user interface 222. In addition, a user can operate MCD 202 via user interface 222. In some embodiments, user interface 222 can be located remote to the accessory. For instance, user interface 222 can be implemented in a remote control device (not shown) that is communicably coupled to accessory 220 and that can be used to control the various functions performed by accessory 220.

MCD I/O interface 226 can allow accessory 220 to communicate with MCD 202 (or another MCD).

Cache 228, which can be implemented using volatile and/or nonvolatile memory, provides storage for various types of information including information obtained from MCD 202. Any or all of this information can be stored in cache 228. Caching of information obtained from MCD 202 by accessory 220 is optional; where used, caching can help speed up performance of accessory 220 by avoiding repeated requests for information from MCD 202.

Controller 224 can execute the firmware used by the accessory. In some embodiments, controller 224 can provide the firmware version information to MCD 202.

Media output device 230, which can be implemented, e.g., as one or more integrated circuits, provides the capability to output various types of media. For example, media output device 230 can include a display screen or a driver circuit and connector for an external display screen, thereby enabling video and/or still images to be presented to a user. Additionally or instead, media output device 230 can also include one or more speakers or driver circuits and connectors for external speakers, thereby enabling audio to be presented to a user. In one embodiment, controller 224 can receive media content signals from MCD 202 via MCD I/O interface 226 and can provide the signals with or without further processing to media output device 230; media output device 230 can transform the signals as appropriate for presentation to the user.

Accessory 220 can be any accessory. Examples of accessories implementing accessory 220 include, e.g., an external speaker dock, a radio (e.g., FM, AM and/or satellite) tuner, an in-vehicle entertainment system, an external video device, or the like. In one embodiment, MCD I/O interface 226 includes a 30-pin connector that mates with the connector used on iPod® and iPhone™ products manufactured and sold by Apple Inc. MCD I/O interface 226 can also include other types of connectors, e.g., Universal Serial Bus (USB) or FireWire connectors, and/or a wireless interface (e.g., Bluetooth or the like).

It will be appreciated that the system configurations and components described herein are illustrative and that variations and modifications are possible. The MCD and/or accessory can have other capabilities not specifically described herein.

Further, while the MCD and accessory are described herein with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of devices including electronic devices implemented using any combination of circuitry and software.

Accessory I/O interface 214 of MCD 202 and MCD I/O interface 226 of accessory 220 allow MCD 202 to be connected to accessory 220 and subsequently disconnected from accessory 220. As used herein, MCD 202 and accessory 220 are "connected" whenever a communication channel between accessory I/O interface 214 and MCD I/O interface 226 is open and are "disconnected" whenever the communication channel is closed. Connection can be achieved by physical attachment (e.g., between respective mating connectors of MCD 202 and accessory 220), by an indirect connection such as a cable, or by establishing a wireless communication channel. Similarly, disconnection can be achieved by physical detachment, disconnecting a cable, powering down accessory 220 or MCD 202, or closing the wireless communication channel. Thus, a variety of communication channels can be used, including wired channels such as USB, FireWire, or universal asynchronous receiver/transmitter ("UART"), or wireless channels such as Bluetooth. In some embodiments, multiple communication channels between a media device and an accessory can be open concurrently, or a media device can be connected to multiple accessories, with each accessory using a different communication channel.

Regardless of the particular communication channel, as long as MCD 202 and accessory 220 are connected to each other, the devices can communicate by exchanging commands and data according to a protocol. The protocol defines a format for sending messages between MCD 202 and accessory 220. For instance, the protocol can specify that each message is sent in a packet with a header and an optional payload. The header provides basic information (e.g., a start indicator, length of the packet, and a command to be processed by the recipient), while the payload provides any data associated with the command; the amount of associated data can be different for different commands, and some commands can provide for variable-length payloads. In various embodiments, the protocol can define specific commands to indicate an action to be taken by the recipient; to signal completion of a task, change of state, or occurrence of an error; and/or to identify the nature of the associated data. In some embodiments, the commands can be defined such that a particular command is valid in only one direction. The packet can also include error-detection or error-correction codes as known in the art.

In some embodiments, every accessory 220 and every MCD 202 that are designed to be interoperable with each other support at least a "general" lingo that includes commands common to all such devices. The general lingo can include commands enabling the MCD and the accessory to identify themselves to each other and to provide general information about their respective capabilities. The general lingo can also include authentication commands that the MCD can use to verify the purported identity and capabilities of the accessory (or vice versa), and the accessory (or MCD) can be blocked from invoking certain commands or lingoes if the authentication is unsuccessful.

In some embodiments, the accessory can identify itself to the MCD via a device identification sequence (DIS). A DIS can begin with a Start DIS command being sent from the accessory to the MCD. The Start DIS command indicates the beginning of the DIS. The command puts the MCD on alert to expect messages consistent with DIS until an End DIS command is received. In some embodiments, during DIS the accessory can send a command to the MCD requesting a response that indicates the protocol (or lingo) version (or versions) supported by the MCD. The MCD can then return a message indicating the protocol (or lingo) version (or versions) supported by the MCD. The accessory can also send a request to the MCD requesting the capabilities of the MCD, whereupon the MCD can respond with a return message indicating various capabilities of the MCD. In some embodiments, the return message can include a bitmask where the state of each bit can indicate whether a specific capability is supported or not supported. These capabilities can include, for example, whether the MCD supports analog line-in, analog line-out, analog video-in, analog video-out, digital audio out, digital audio in, digital video in, digital video out, speakerphone, communication with MCD operating system application, etc.

During the DIS, the accessory can send a sequence of identification commands that define the accessory's capabilities and preferences using a number of tokens. For example, the accessory can send a "lingo" token to indicate the various lingoes supported by the accessory, the accessory can send a "accessory capabilities" token to indicate the various features supported by the accessory, or the accessory can send a "accessory preferences" token that indicates an initial state of a predefined preference for an MCD capability (e.g., whether the MCD should initially turn the audio-out "ON" or "OFF"). In some embodiments, during the DIS, the accessory can send a command indicating the various lingoes supported by the accessory. This identification of a set of usable lingoes can be sent, e.g., by using a "lingo token" and can include an indication of the lingoes as the token's value. In some embodiments, accessory capabilities can be defined using an accessory capabilities token. In some embodiments, the accessory capabilities can be sent as a bitmask where the state of each bit can indicate whether a capability is supported by the accessory. In some embodiments, the accessory preferences message can be sent using the "accessory preferences" token and can include a bit mask with each bit indicating an initial state of a predefined preference for an MCD capability. For instance, capabilities can have two or more states, and the accessory preferences can indicate the initial state of one or more capability. For example, if the MCD capabilities indicated that the MCD supports video input, then accessory preferences can indicate whether video input to the MCD should originally be in the "ON" state or the "OFF" state.

The accessory can include multiple such tokens in a single identification command sent to the MCD during the DIS process or can send each token as part of a separate identification command. When multiple tokens are sent via a single command, the command can include all the tokens or part of one or more tokens. In the instance where the accessory includes multiple tokens in a single identification command, each token in the multiple tokens can carry different types of information. The MCD can extract the token (or tokens) from the identification command and determine its contents.

In some embodiments of the present invention, DIS-related message can be used to determine the type of accessory and firmware being used by the accessory. For example, the order in which the accessory sends the various tokens during the DIS and the manner in which the tokens are included in a sequence of identification commands can depend on the firmware version of the accessory. Thus it is possible to analyze the sequence of identification commands received from an accessory to determine the firmware used by that accessory. In other embodiments, the MCD can analyze the sequence and/or the type of tokens in a particular identification command to determine firmware being used by the accessory.

Figure 3:
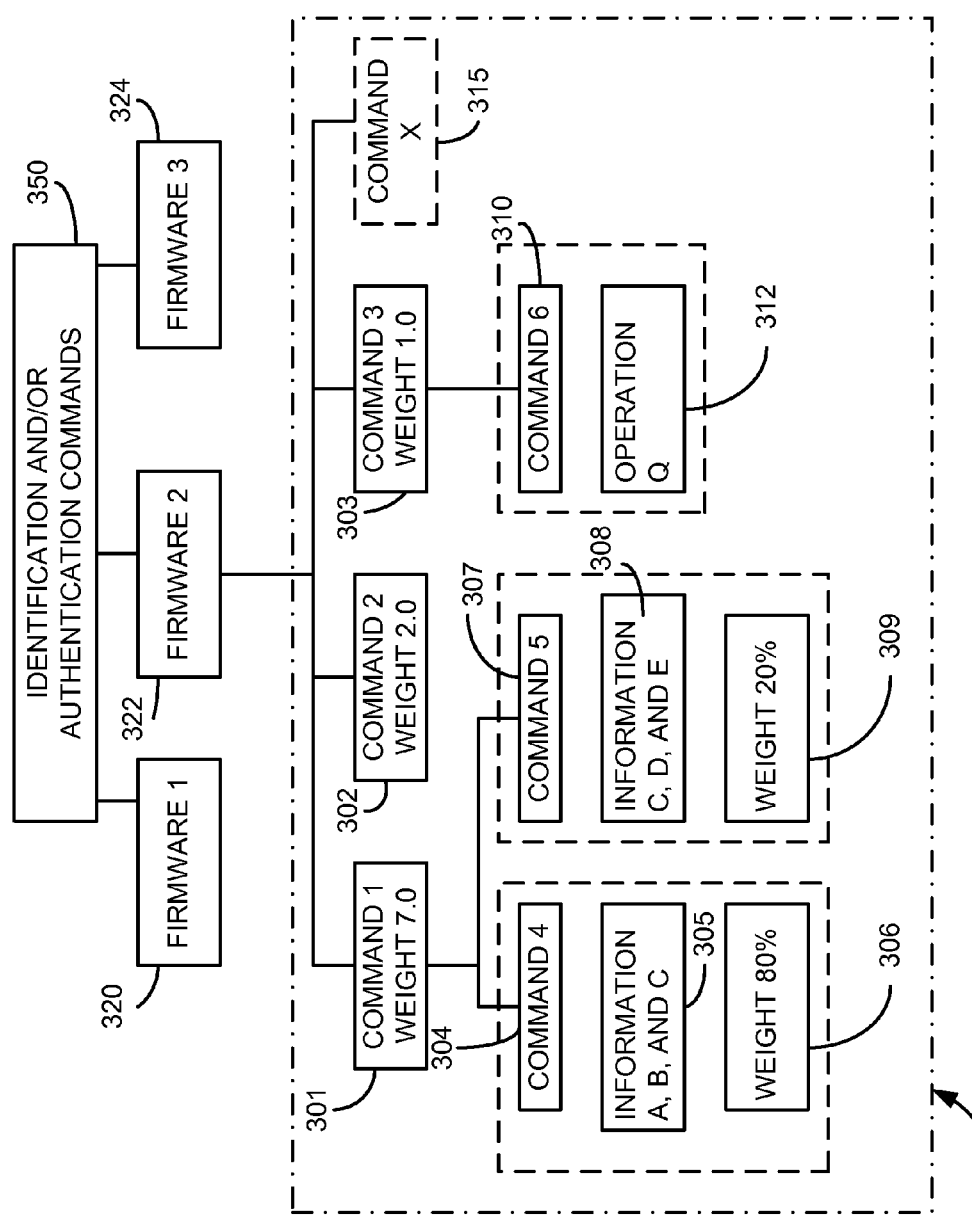
FIG. 3 illustrates a predictive analytics data tree that can be stored in a predictive analytics data store according to an embodiment of the present invention.

As described above, each accessory can use a single firmware version at any given time. Every firmware version can have a specific set of commands that the firmware uses. The commands that a firmware version uses can depend on the functionality offered by the firmware version. The MCD can store information indicating commands or command sequences associated with particular firmware in a predictive analytics data store. FIG. 3 illustrates information that can be included in a predictive analytics data store according to an embodiment of the present invention. Predictive analytics data store can include one or more predictive analytics data trees 300. The following description is provided with reference to a sample predictive data tree 300 illustrated in FIG. 3.

Predictive analytics data tree (hereinafter "data tree") 300 can have a structure as illustrated in FIG. 3, other structures can also be used. The predictive analytics data store can include one or more data trees 300. Each data tree is associated with a single firmware version. For example, as illustrated in FIG. 3, data tree 300 is associated with firmware version 2 (322). "Associated" in this context means that data tree 300 includes command identifiers and related information specific to firmware version 2 (322). A different data tree can be generated for other firmware versions, e.g., firmware version 1 (320) and firmware version 3 (324). Thus, at any given time, a MCD can store multiple data trees for multiple firmware versions in the predictive analytics data store. In some embodiments, the data trees may be pre-programmed, e.g., by downloading data from a host computer as described above. In other embodiments, the MCD may "build" the data trees or modify pre-programmed data trees based on its interaction with various accessories. For example, the MCD can keep track of the sequence of commands received from the accessory to determine a chronological order of commands for the firmware version being executed by that accessory. In some embodiments, the MCD can store data tree 300 on a local storage device, e.g., storage device 206 of FIG. 2. In other embodiments, data tree 300 may be stored at an external location accessible by the MCD.

As discussed earlier, the identification/authentication commands 350 can be common to all accessories designed to interoperate with the MCD. In some embodiments, during the accessory identification and authentication process, the MCD can determine the firmware version that the accessory is using. Once the firmware version is determined, the MCD can then consult the data tree corresponding to that firmware version to predict commands that may be received from the accessory. In some embodiments, if the MCD encounters a firmware version for the first time, it can start building a data tree for that firmware version.

FIG. 3 illustrates data tree 300 for firmware version 2 (322). Date tree 300 can include first-level nodes 301, 302, and 303 that immediately follow identification and authentication commands 350. Nodes 301-303 can be associated with commands 1-3, respectively. As illustrated, any of commands 1-3 can follow identification and authentication commands 350. It is to be noted that even though there may be more than one command that can potentially follow the identification and authentication commands (or any other command) 350, at any given time only one of those commands can be received from the accessory. Referring to FIG. 3, even though any of commands 1-3 can potentially follow identification and authentication commands 350, only one of the commands 1-3 can be received by the MCD at a time. In some embodiments, each of the commands 1-3 can have weights associated with them. The weights can indicate the probability of a particular command being received next from the accessory after identification commands 350. The higher the weight associated with a command, the higher the possibility that the command will be received next. For example, as illustrated in FIG. 3, command 1 has weight of 7.0, command 2 has a weight of 2.0, and command 3 has a weight of 1.0. In this instance, it is more likely that command 1 will be received next from the accessory. Based on this determination, the MCD can prepare resources needed to respond to command 1. The weight may be expressed in various ways such as integers, percentage values, alphabets, and the like.

In some embodiments, data tree 300 can represent known command sequences that firmware version 2 can send to the MCD following the identification and authentication commands 350. As illustrated in FIG. 3, data tree 300 includes a hierarchy of nodes (301-304, 307, and 310), each associated with a command. The link between the nodes define a temporal relationship between commands likely to be received from an accessory executing firmware version 2. Each of the commands 1-3 can have zero or more predicted next commands. As illustrated in FIG. 3, either command 4 (node 304) or command 5 (node 307) can follow command 1. Command 3 (node 303) can be followed only by command 6 (node 310). In some embodiments, after a command is received from the accessory, the MCD can retrieve the data to be sent in response to the command, e.g., playlist information stored in the media assets data store of the MCD. In other embodiments, a command received from the accessory may specify an operation to be performed by the MCD, e.g., configure video output port. In addition to including nodes associated with commands, data tree 300 can also include the information about the resources to be invoked (e.g., information to be accessed and/or operations to be performed) in response to the various commands. For example, in FIG. 3, a response to command 4 can include information A, B, and C.

As illustrated in FIG. 3, command 1 can be followed either by command 4 or command 5. In some embodiments, a command may be followed by only one other command. For example, as illustrated in FIG. 3, command 3 may only be followed by command 6. In an embodiment, if the MCD determines that it just received command 3 from the accessory, the MCD can consult data tree 300 to determine that it will most likely receive command 6 next since that is the only command known to follow command 3 per data tree 300. Based on that determination, the MCD can initiate operation 312 associated with executing command 6, even before command 6 is actually received from the accessory. This can significantly reduce the response time of the MCD for executing any given command received from the accessory. This is especially useful for information that can take a long time to retrieve(e.g., retrieving media asset information from the media assets data store, rendering web pages, etc.) or operations that take a long time to perform such as starting a media player resident on the MCD, configuring network connections, configuring video out for a display port, etc.

As illustrated in FIG. 3, some commands might not always be followed by the same command. For instance, command 1 can be followed by either of commands 4 or 5. In some embodiments, each of the commands 4 and 5 can have a weight 306 and 309, respectively, associated with it. Weights 306 and 309 can indicate a probability that each of the commands 4 and 5 will be received next after command 1. As illustrated in FIG. 3, there is a 80% probability that command 4 will follow command 1 and a 20% probability that command 5 will follow command 1. In this instance, the MCD can conclude that command 4 will most likely follow command 1 based on the probability value. Based on this conclusion, the MCD can retrieve information A, B, and C, e.g., from the media assets data store, to be sent in response to command 4. In some embodiments, weights 306 and 309 may have numeric values, with a higher value indicating a higher likelihood of a command immediately following another command. For example, the weights 306 and 309 may be expressed in terms of percentage values, e.g., as illustrated in FIG. 3. A higher percentage value can indicate a higher probability that a particular command will immediately follow a previous command. Of course one skilled in the art will realize that there are alternative techniques for assigning weighted values. It is to be noted that a weight can be assigned to every command at every node in a data tree.

In another embodiment, if the MCD determines that it just received command 1, the MCD can consult data tree 300 and determine that it will either receive command 4 or command 5 next from the accessory. Thereafter, the MCD can determine information common to both the commands 4 and 5. The common information is the information that will be sent to the accessory regardless of which of the commands 4 or 5 is received from the accessory. For instance, as illustrated in FIG. 3, the MCD can send information 305 including A, B, and C in response to command 4 and can send information 308 including C, D, and E in response to command 5. In this instance, the MCD can retrieve information C prior to receiving either of the commands 4 or 5 since the MCD would have to send information C in response to receiving either of commands 4 or 5. Thus information C is the common information in this instance. By retrieving the common information, the MCD can significantly reduce its response time. Thus, in the above example, if the MCD receives command 4, it only has to retrieve information A and B after receiving command 4 since information C would have already been retrieved prior to receiving command 4. If the MCD receives command 5, only information D and E need to be retrieved after receiving command 5 thus reducing the MCD's response time.

In some embodiments, the MCD can, in addition to determining common resources for the next potential command likely to be received, also determine common resources for a sequence of commands that is likely to be received after a particular command. For example, consider that the MCD receives command 1. As illustrated in FIG. 3, the MCD can determine that command 4 is likely to be received next. In addition, the MCD can also determine a command that is most likely to be received after the command 4 and determine any resources in common to command 4 and the next potential command. The MCD can then pre-fetch the common resources for the sequence of commands. In some embodiments, a sequence of commands can be exchanged between the MCD and the accessory before a resource is needed or an action is performed. In this instance, the MCD can predict the sequence of commands based on receiving the first command in the sequence to determine the resources needed at the end of the command sequence. The sequence of commands can be a separate branch of the data tree.

In some embodiments, two or more commands that may potentially follow a command might have no information in common between them and may have similar weights (or no weights) associated with them. In such an instance, the MCD can (a) randomly select a command from the two or more commands and retrieve information to be sent in response to that command, (b) retrieve information to be sent in response to all of the two or more commands depending on the amount of information or (c) select the command that needs resources that take a long time to invoke. For example, resources that can take a long time to be invoked can include starting a media player, pre-fetching web pages, configuring network connections, starting applications that typically take a long time to start, access media assets data store, or configuring video out for a display port.

In some embodiments, the MCD can select a command from the two or more possible commands as being likely to be received next based on information in the corresponding data tree. However, the MCD can actually receive a different command than the selected command. In this instance, the MCD can keep track of its selected command and the command actually received from the accessory and use this information to update the data tree and/or update the weights for the two or more commands. In some embodiments, the MCD can track the received command sequences for each firmware version and periodically update the data tree for each firmware version.

In some embodiments, as illustrated in FIG. 3, the MCD may receive a command X that the MCD has never received before while interacting with accessories using firmware version 2. This can happen if different accessories are running the same firmware version but with different option sets, which can include commands that are not common between the two option sets. If the MCD receives a previously unencountered command X, the MCD can create a new entry for command X in data tree 300 for that firmware version. To create a new entry, the MCD can determine the command immediately preceding command X and add command X to the branch associated with that command. For example, as illustrated in FIG. 3, when the MCD encounters a new command X after identification and authentication commands 350, the MCD can create a new node (315) for command X in data tree 300, immediately following identification and authentication commands 350. Thus, now there are four possible commands that can follow identification and authentication commands 350 in data tree 300 for firmware version 2. The MCD can then adjust the weights associated with the other nodes 301, 302, 303, and assign a new weight to node 315.

It is to be noted that data tree 300 is shown for illustrative purposes only and for ease of explanation. One skilled in the art will realize that data tree 300 can include more or less information than what is indicated in FIG. 3. In some embodiments, data tree 300 may have additional levels to represent longer sequences of commands. In some embodiments, one or more commands may be repeated in a sequence of commands.

As described earlier, a data tree may be pre-programmed into the MCD using an external source such as a host computer. In some embodiments, the MCD may build the data tree using information it gathers from interaction with various accessories and firmware versions. Since a data tree is specific to a firmware version, before starting to build a data tree, the MCD can determine the firmware version that a particular accessory is executing. The MCD can determine the firmware version in various ways. In some embodiments, the MCD may communicate an updated data tree to the host computer for updating the pre-programmed data tree resident on the host computer.

In one embodiment, the accessory may include the firmware version information as part of the identification and authentication commands exchanged after initial connection with the MCD. In this instance, the MCD can extract the firmware version information from the payload of the command carrying this information. For example, the accessory may include the firmware version information in the accessory capabilities message describe above.

In other embodiments, the MCD can "learn" from its interactions with the accessory and determine the firmware based on the interactions. In an embodiment, the MCD can analyze a sequence of identification commands received from the accessory during the DIS process described above to determine a firmware version for the accessory. A particular firmware version can send the commands during the DIS process in a specific order, and different firmware versions may send the DIS information in different orders. To the extent that the order of DIS tokens or commands is distinctive to a particular firmware version, the MCD can analyze the order of the commands received from the accessory to distinguish one firmware version from another. In other embodiments, the MCD may determine the firmware version of the accessory by analyzing (a) a specific order of information provided in the sequence of identification commands, (b) time between successive commands in the sequence of identification commands, (c) total time elapsed for receiving the sequence of identification commands, and/or (d) type of identification commands received from the accessory.

Once the MCD determines the firmware version, it can build a data tree for that firmware version. In some embodiments, the MCD can keep track of various commands exchanged with an accessory that is executing a particular firmware version to determine a chronology or sequence of commands sent by the accessory. Based on this information, the MCD can build a data tree identifying the temporal relationship between the various commands, the information to be sent in response to each of the commands, and/or an operation to be performed in response to each of the commands. In some embodiments, there can be more than one command that follows a particular command. In this instance, the MCD can track frequency of occurrence of different commands at a particular point in the sequence. Based on this, the MCD can generate and assign a weight to each of the commands. The weight associated with each command can indicate the probability of that command (as opposed to another command) immediately following the preceding command. For example, if a first command can be potentially followed by three commands, the MCD can track the number of times each of the three commands is received immediately after the first command. This information can then be used to determine a weight for each command. The weight assigned to each of the three commands can indicate the likelihood that each of the three commands will immediately follow the first command. This process can be performed on a continuing basis by the MCD so that at any given time, the most updated data tree for a given firmware version is available to the MCD.

Data tree 300 can be dynamically updated by the MCD based on its ongoing interactions with each accessory. In some embodiments, the MCD can keep track of its own predictions about the next command likely to be received from the accessory and update the data tree accordingly. For instance, for a particular firmware version, the MCD can track the number of times it correctly predicted the command likely to be received from the accessory and number of times when the prediction was incorrect. This information can indicate the accuracy of the information in the data tree for the firmware version. In addition, the MCD can use the tracking information to modify the data tree to ensure that the data tree reflects the most current and accurate scenario for that particular firmware version.

Figure 4:
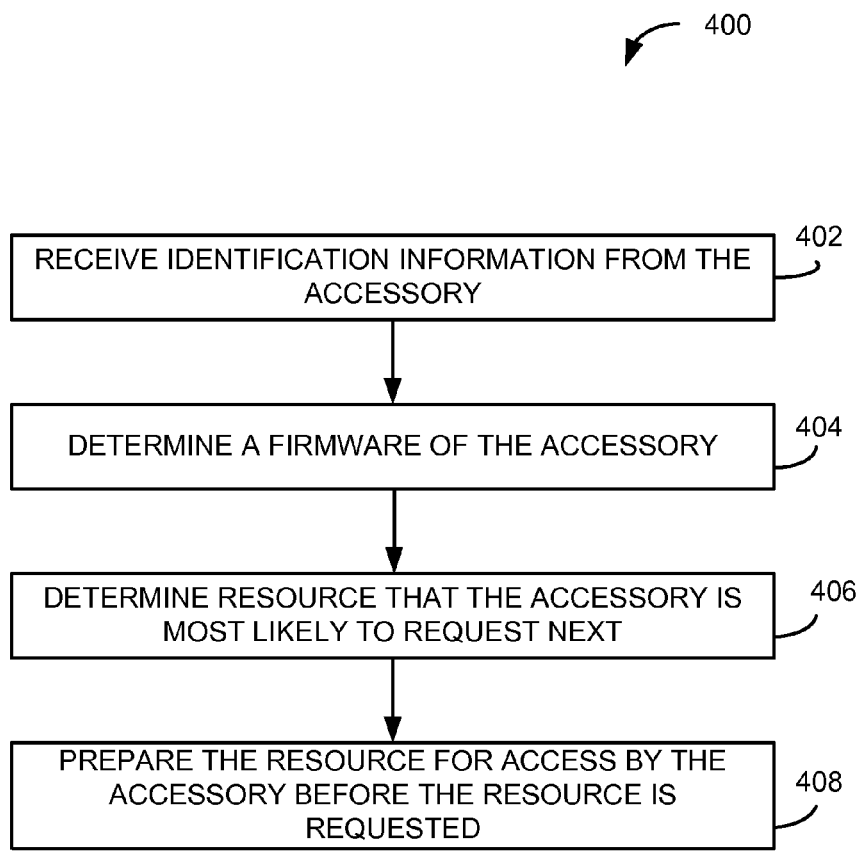
FIG. 4 is a flow diagram of a process for operating a mobile computing device according to an embodiment of the present invention.

As discussed above, the MCD can use the information in the predictive analytics data store to anticipate one or more commands that may be received from the accessory. Based on information about the one or more anticipated commands, the MCD can prepare resources for access (e.g., by pre-fetching) in response to those anticipated commands. FIG. 4 is a flow diagram of a process 400 for operating a mobile computing device according to an embodiment of the present invention. Process 400 can be performed by, e.g., MCD 202 of FIG. 2.

At block 402, the MCD can receive identification information from an accessory coupled to the MCD. In some embodiments, the identification information may be received in the form of one or more packets of data communicated using one or more identification commands. At block 404, the MCD can determine the firmware version being used by the accessory. The determination of the firmware version can be based on the identification commands and/or information communicated via the identification commands. Thereafter, the MCD can determine a resource likely to be requested next by the accessory based on the firmware version, at block 406, e.g., using data tree 300 of FIG. 3. As described above, each firmware version supports a specific set of commands and each command can have a specific resource that is to be invoked in response to the command. Therefore, in an embodiment, the MCD can first determine a command that is likely to be received next and then determine resources to be invoked in response to that command. For example, a resource can be metadata associated with a media asset or an operation to be performed. Once the MCD determines the resource to be requested, the MCD, at block 408, can prepare that resource for access by the accessory before the resource is requested by the accessory.

It will be appreciated that process 400 described herein is illustrative and that variations and modifications are possible. Acts described as sequential can be executed in parallel, order of acts can be varied, and acts can be modified or combined.

Figure 5:
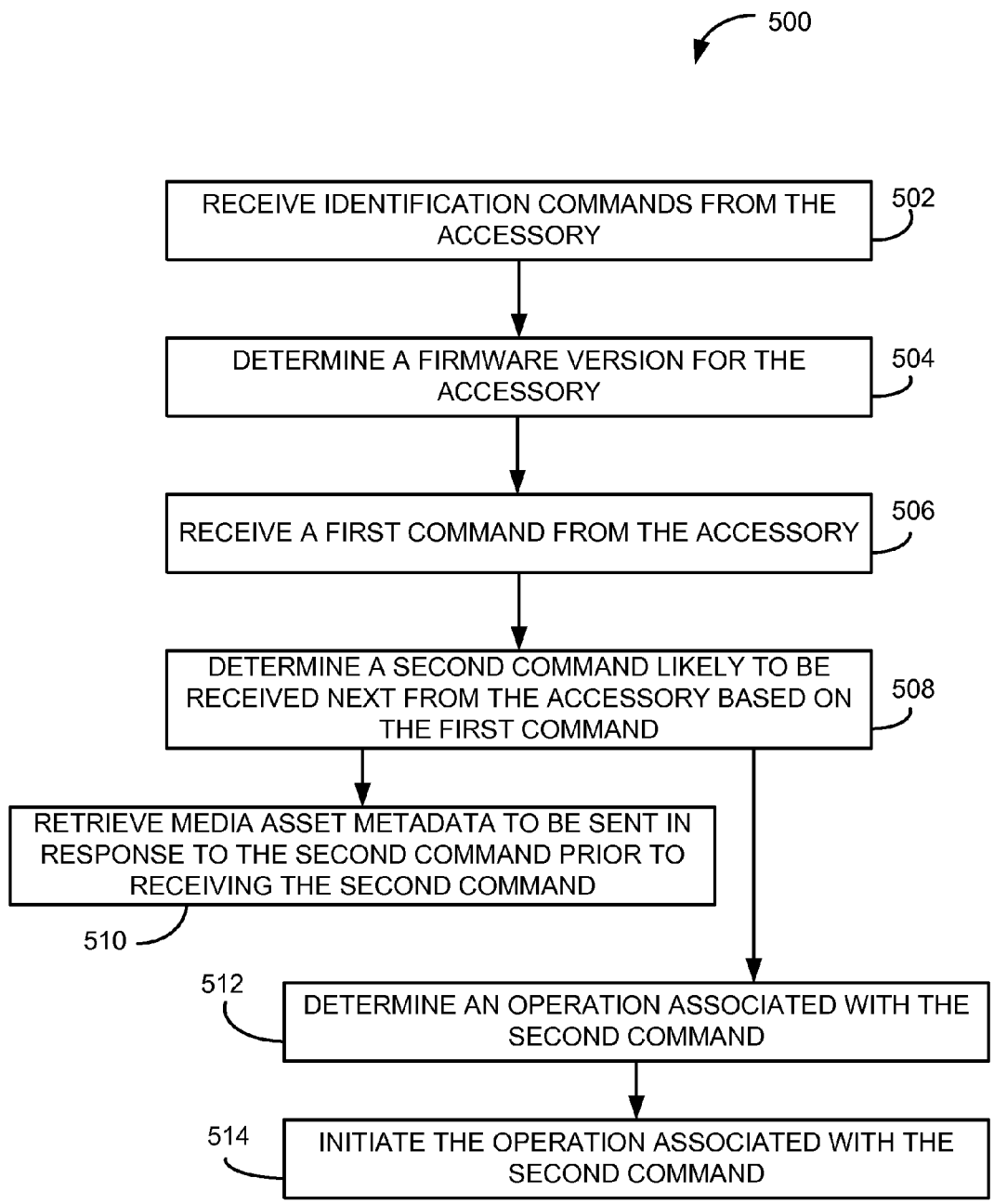
FIG. 5 is a flow diagram of a process for communicating with an accessory according to an embodiment of the present invention.

FIG. 5 is a flow diagram of a process 500 for communicating with an accessory according to an embodiment of the present invention. Process 500 can be performed by, e.g., MCD 202 of FIG. 2. At block 502, the MCD can receive identification and authentication commands from the accessory. As described above, before an accessory can exchange data with the MCD, the accessory can be first authenticated and identified. At block 504, the MCD can determine a firmware version for the accessory. As described above, the accessory can either inform the MCD about the firmware version or the MCD can determine the firmware version based on analysis of the identification commands. At block 506, the MCD can receive a first command. After receiving the first command, the MCD can locate the node associated with the first command in the data tree corresponding to that firmware version stored in the predictive analytics data store. Thereafter, at block 508, the MCD can determine a second command that is most likely to follow the first command using the data tree and the first command. Once the MCD determines the second command most likely to be received from the accessory following the first command, the MCD can retrieve the information to be sent in response to the second command at block 510 before actually receiving the second command. In some embodiments, the information can be media asset metadata for one or more media assets. In other embodiments, the MCD can determine an operation to be performed in response to the second command at block 512, e.g., configuring a video out port. Once the MCD determines the operation to be performed, it can initiate that operation at block 516 even before the second command is actually received from the accessory.

It will be appreciated that process 500 described herein is illustrative and that variations and modifications are possible. Acts described as sequential can be executed in parallel, order of acts can be varied, and acts can be modified or combined. For instance, in some embodiments, the second command can have an operation that needs to be performed in addition to or instead of information that needs to be sent in response. In this instance, the MCD can pre-fetch the information and initiate the operation associated with the command. In some embodiments, the MCD can predict the first command following determination of the firmware version.

Figure 6:
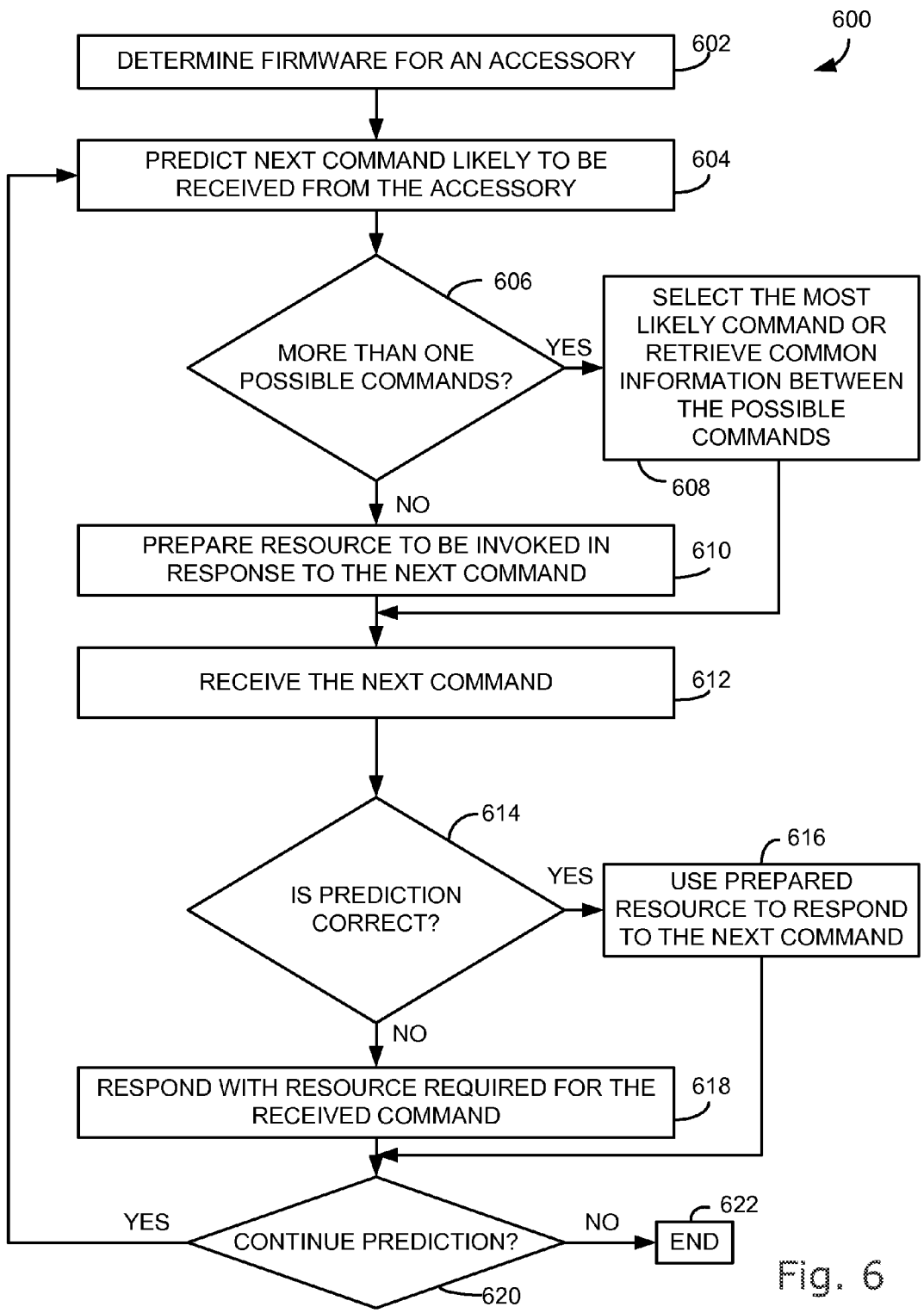
FIG. 6 is a flow diagram of a process for operating a mobile computing device according to another embodiment of the present invention.

FIG. 6 is a flow diagram of a process 600 for operating a MCD according to an embodiment of the present invention. Process 600 can be performed by, e.g., MCD 202 of FIG. 2.

The MCD can determine firmware being used by the accessory using any of the techniques described herein (602). Once the MCD has determined the firmware being used by the accessory, the MCD can consult the corresponding data tree to predict the next command likely to be received from the accessory (604). The MCD can then determine whether there is only one possible command that can be received next or whether the next command can be one of several possible commands that can be received (606). If it is determined that the next command can be one of several possible commands that can be received, the MCD can either select the most likely command among the possible commands or determine resources common to all the possible commands (608). Thereafter the MCD can prepare resources associated with the selected command or prepare the common resources.

If it is determined that there is only one possible command that can be received next from the accessory, the MCD can prepare resources needed for that command (610). Thereafter, the MCD can received the next command (612). MCD can check whether the next command actually received matches the command predicted by the MCD (614). If the next command actually received matches the predicted command, the MCD can use the resources prepared in advance for that command (616). If it is determined that the next command actually received is different from the predicted command, the MCD can appropriately respond to that command (618). Thereafter the MCD can verify whether it should continue predicting commands that could be received from the accessory (620). If it is determined that the MCD should continue predicting future commands, process 600 returns to block 604. If it is determined that the MCD should stop predicting future commands, process 600 ends (622). A determination that the MCD should not continue to predict future commands can be made for several reasons, e.g., (a) there may be too many possible commands that can be received next from the accessory and a determination cannot be made of which command among them is most likely to be received next, (b) a lowest level of a data tree has been reached and there is no more information in the data tree about a command most likely to be received next from the accessory, (c) it is determined that the MCD has made numerous incorrect predictions and thus there is very low possibility that any future predictions will actually be of any help to the MCD, (d) a previous command indicates that a user has assumed manual control of the accessory thus making it difficult to predict a next command since the user's intentions cannot be accurately predicted.

It will be appreciated that process 600 described herein is illustrative and that variations and modifications are possible. Acts described as sequential can be executed in parallel, order of acts can be varied, and acts can be modified or combined. For instance, in some embodiments, determining firmware for an accessory (602) may involve additional sub-steps as described in an example below.

Figure 7:
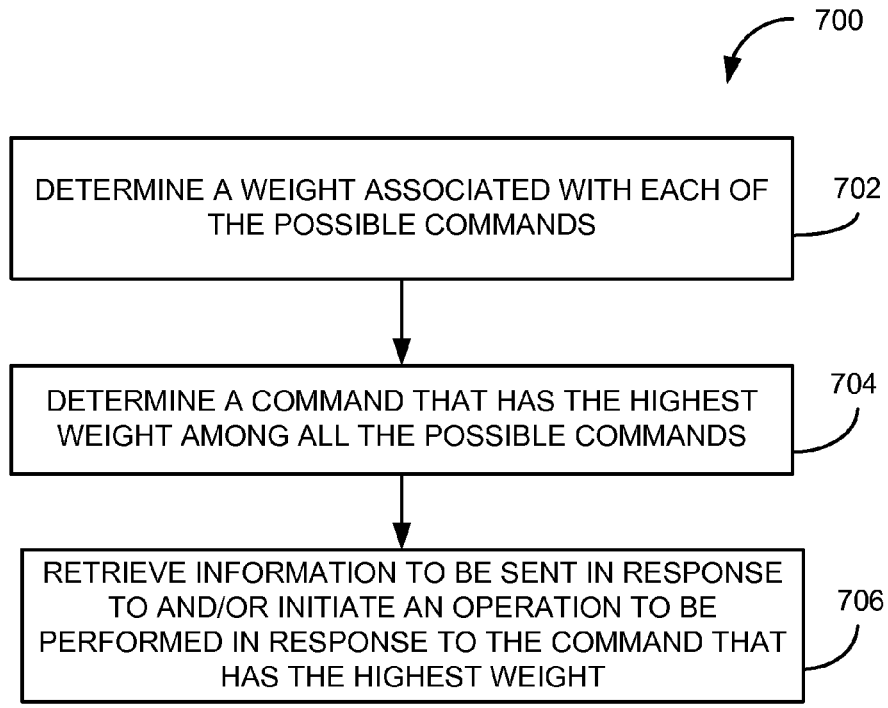
FIG. 7 is a flow diagram of a process for predicting accessory behavior according to an embodiment of the present invention.

As described above in relation to FIG. 6, if the MCD determines that the next command to be received can be one of multiple commands, the MCD can either choose the most likely command among the multiple commands or determine resource(s) common to all possible commands and prepare that resource in advance. FIG. 7 is a flow diagram of a process 700 for operating a MCD according to an embodiment of the present invention. Process 700 represents one example of what the MCD might do if it is determined that the next command to be received can be one of multiple possible commands, e.g., at block 608 of FIG. 6.

The MCD can determine a weight associated with each of the possible commands (702). The MCD can then determine which one of the possible commands has the highest weight associated with it (704) among all the possible commands. For example, see description of weights for FIG. 3 above. As described above, a higher weight indicates a higher probability that the command will be received next from the accessory. Based on that determination the MCD can conclude that the command with the highest weight is most likely to be received next from the accessory and prepare information to be sent in response to that command and/or initiate an operation to be performed in response to that command (706).

Figure 8:
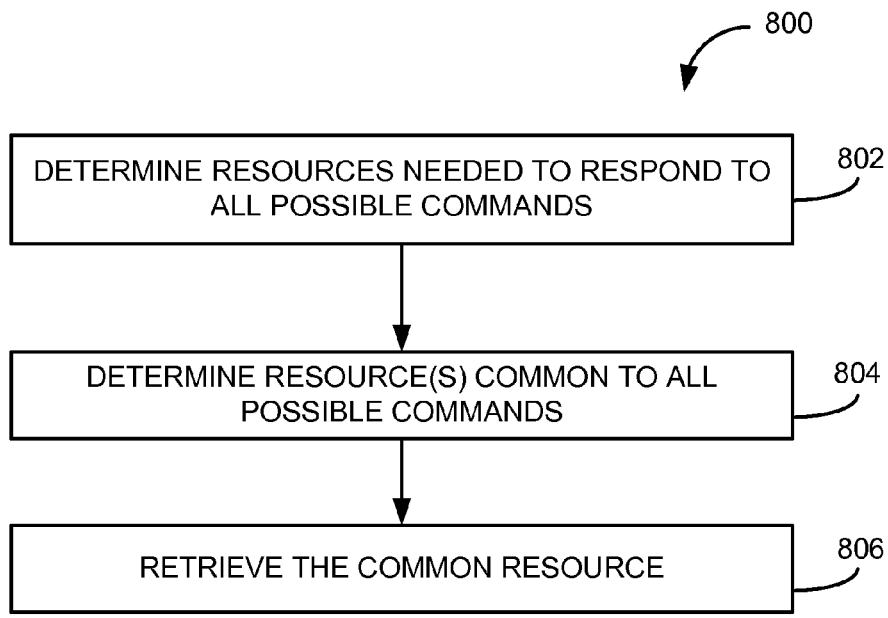
FIG. 8 is a flow diagram of a process for predicting accessory behavior according to another embodiment of the present invention.

FIG. 8 is a flow diagram of a process 800 for operating a MCD according to another embodiment of the present invention. Process 800 represents another example of what the MCD might do if it is determined that the next command to be received can be one of multiple commands, e.g., block 608 of FIG. 6.

In this embodiment, the MCD can determine resources needed to respond to all the possible commands, one of which can be received next from the accessory (802). Thereafter, the MCD can determine one or more resources that are common to all the possible commands that can be received next from the accessory (804). Once that common resource or those common resources are determined, the MCD can retrieve the common resource(s) (806) and make it available for the accessory.

It is to be noted that processes 700 and 800 represent only two examples of how the MCD might resolve the situation where there are multiple possible commands that may be received next from the accessory and the MCD has to choose one of the commands as the most likely to be received next from the accessory. One skilled in the art will realize that there are other methods/alternatives that the MCD can use to determine the most likely command to be received next when faced with a choice between multiple commands. For example, the MCD may choose a command that needs a resource that takes the longest to prepare, e.g., a command that requests a list of all media assets from the media assets data store.

Figure 9:
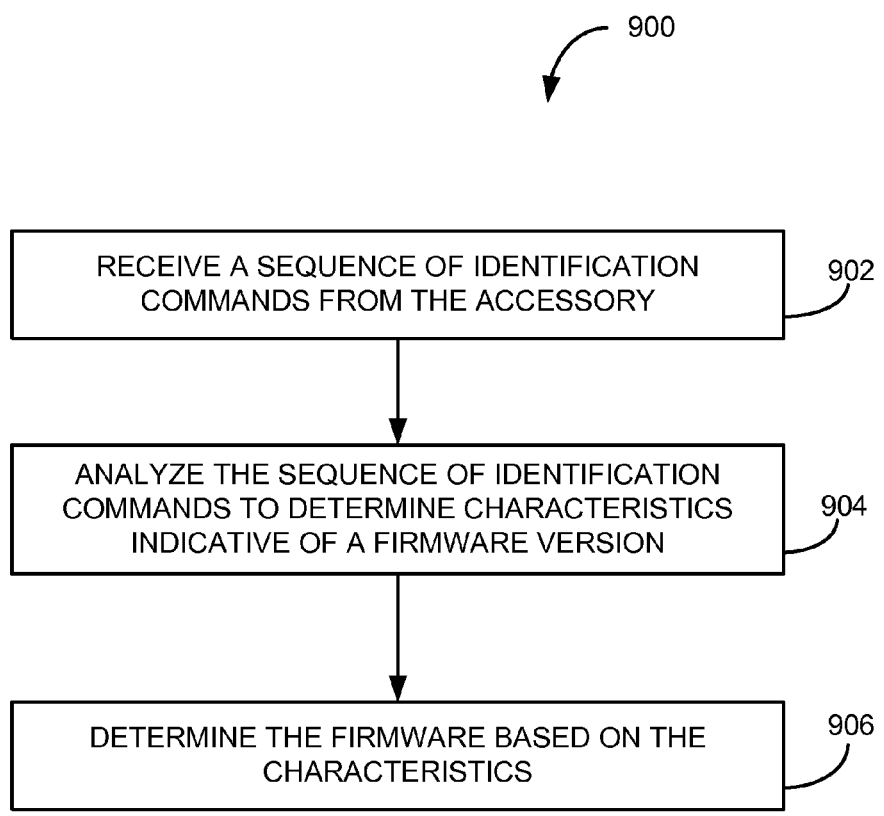
FIG. 9 is a flow diagram of a process for determining firmware being executed by an accessory according to an embodiment of the present invention.

As described above, the MCD can determine a firmware version being used by the accessory before starting to predict the command that is likely to be received next from the accessory. FIG. 9 is a flow diagram of a process 900 for determining a firmware version for the accessory according to an embodiment of the present invention. Process 900 can be performed by, e.g., MCD 202 of FIG. 2. The technique illustrated by process 900 can be used to determine firmware being used by the accessory in any of the other embodiments described in this specification.

At block 902, the MCD can receive a sequence of identification/authentication commands from an accessory coupled to the MCD. As described above, the identification and authentication commands serve to verify that the accessory is authorized to be used with the MCD. At block 904, the MCD can analyze the sequence of identification commands exchanged during the identification process to determine one or more characteristics that are indicative of a firmware version used by the accessory. For example, as described above, the MCD can analyze a specific order of information provided in the sequence of identification commands to determine the firmware version that the accessory is using. Once the MCD determines the one or more characteristics, it can determine the firmware being used by the accessory at block 906, e.g., by consulting a look-up table that lists the characteristics and the corresponding firmware version.

Figure 10:
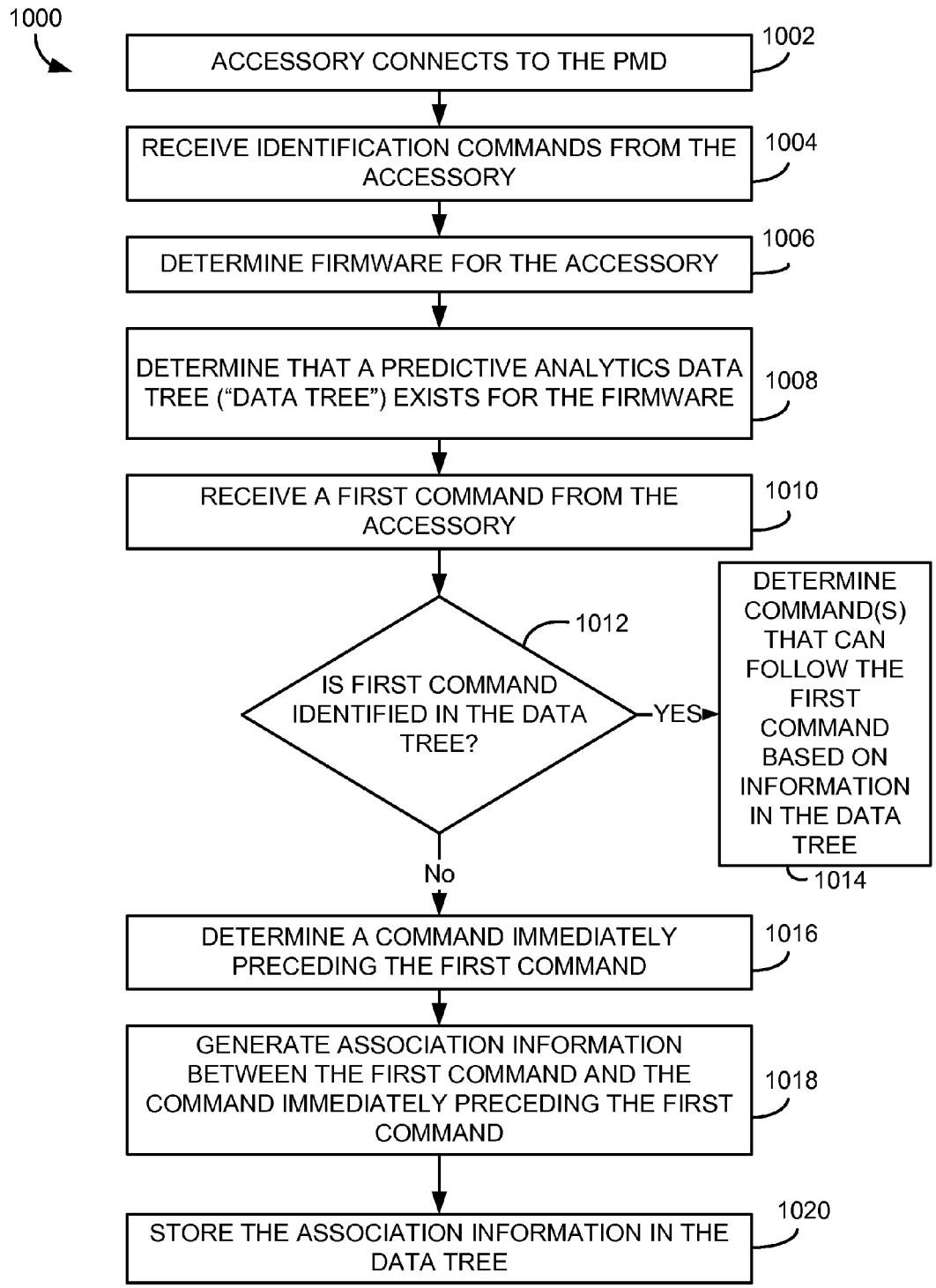
FIG. 10 is a flow diagram of a process for updating a predictive analytics data tree according to an embodiment of the present invention.

FIG. 10 is a flow diagram of a process 1000 for updating a predictive analytics data tree according to an embodiment of the present invention. Process 1000 can be performed, e.g., by MCD 202 of FIG. 2. At block 1002, the MCD can verify that an accessory is connected to the MCD. At block 1004, the MCD can receive identification packets from the accessory. The identification packets can be sent as part of one or more commands. The identification packets serve to identify the accessory to the MCD. Based on the identification packets, the MCD can determine firmware being used by the accessory at block 1006. Once the firmware for the accessory is determined, the MCD can determine, at block 1008, whether a predictive analytics data tree (or data tree) exists for that firmware in the predictive analytics data store. In some embodiments, if a corresponding data tree for the firmware does not exist, the MCD can start building a new data tree for that firmware. At block 1010, the MCD can receive a first command from the accessory. Upon receiving the first command, the MCD can consult the data tree to determine, at block 1012, whether the first command is identified in the data tree,. If the first command is identified in the data tree, the MCD can determine, at block 1014, one or more commands that can potentially be received next from the accessory based on information in the data tree. Thereafter, the MCD can proceed to pre-fetch information to be sent in response to the first command and/or initiate an operation associated with the first command.

If at block 1012 it is determined the first command is not identified in the data tree, i.e., the first command is a previously un-encountered command, the MCD can determine a command that was received just before the first command, at block 1016. Once that command is determined, the MCD can, at block 1018, generate association information between the first command the command that was received just before the first command. In some embodiments, the association information can include temporal relationship between the first command and the command that was received just before the first command and information to be sent in response to the first command and/or an operation to be performed in response to the first command. At block 1020, the MCD can update the data tree for that firmware with the association information and store the updated data tree in the predictive analytics data store.

It will be appreciated that process 1000 described herein is illustrative and that variations and modifications are possible. Acts described as sequential can be executed in parallel, order of acts can be varied, and acts can be modified or combined. For instance, block 1006 for determining firmware for the accessory can include several sub-steps such as analyzing the sequence of identification commands to determine certain characteristics and using the characteristics to determine firmware for the accessory, e.g., as illustrated in FIG. 9 above.

While the invention has been described with respect to specific embodiments, those skilled in the art will recognize that numerous modifications are possible. For instance, the data tree can be expanded to include any number of command sequences. The data tree can have many different levels. The data tree can be updated to include command sequences for new firmware versions and/or modify the existing command sequences to incorporate new information gathered by the MCD based on its interactions with accessories that use different firmware versions.

In addition, embodiments of the present invention can be realized using any combination of dedicated components and/or programmable processors and/or other programmable devices. While the embodiments described above can make reference to specific hardware and software components, those skilled in the art will appreciate that different combinations of hardware and/or software components can also be used and that particular operations described as being implemented in hardware might also be implemented in software or vice versa.

Computer programs incorporating various features of the present invention can be encoded on various non-transitory computer readable media for storage and/or transmission; suitable media include magnetic disk or tape, optical storage media such as compact disk (CD) or DVD (digital versatile disk), flash memory, and the like. Computer readable media encoded with the program code can be packaged with a compatible device or provided separately from other devices (e.g., via Internet download).

Thus, although the invention has been described with respect to specific embodiments, it will be appreciated that the invention is intended to cover all modifications and equivalents within the scope of the following claims.

What is claimed is:

1. A method comprising, by a mobile computing device:
receiving identification information from an accessory coupled to the mobile computing device;

identifying, based on the identification information, firmware being executed by the accessory;

determining, based on the firmware, a resource that the accessory is most likely to request by querying a predictive analytics data store;

preparing the resource for the accessory prior to receiving a request for the resource; and making the resource available to the accessory in response to a request for the resource from the accessory.

2. The method of claim 1 wherein receiving the identification information from the accessory includes receiving a sequence of identification commands from the accessory and wherein determining firmware being executed by the accessory comprises analyzing one or more of:

a specific order of information provided in the sequence of identification commands;

time between successive commands in the sequence of identification commands;

total time elapsed for receiving the sequence of identification commands; or type of commands received from the accessory.

3. The method of claim 1 wherein the resource includes media asset metadata stored in a media assets data store.

4. The method of claim 1 wherein the resource includes a video output port.

5. The method of claim 1 wherein the identification information includes version information for the firmware being executed by the accessory.

6. The method of claim 1 wherein the predictive analytics data store stores:

a first command identifier identifying a first command supported by the firmware; and a second command identifier identifying a second command supported by the firmware and sequentially following the first command; and correlation information between the first command and the second command.

7. The method of claim 6 wherein determining information that the accessory is most likely to request comprises:

receiving the first command from the accessory;

determining, based on the correlation information, that the second command is likely to be received next from the accessory; and determining information to be sent in response to the second command.

8. The method of claim 7 further comprising:

after receiving the first command, receiving a previously un-encountered command from the accessory;

generating correlation information indicating that the previously un-encountered command was received immediately following the first command; and storing the correlation information in the predictive analytics data store.

9. A mobile computing device comprising:

a processor; and an accessory interface coupled to the processor;

wherein the processor is configured to:

communicate with an accessory via the accessory interface to determine a firmware version of the accessory;

communicate with a predictive analytics data store to determine a data tree corresponding to the firmware version;

receive a first command from the accessory;

determine, using the data tree and the first command, a second command from the set of commands likely to be received next from the accessory; and prior to receiving the second command, initiating an operation to be performed in response to the second command.

10. The mobile computing device of claim 9 wherein the operation comprises:

retrieving media asset metadata from a media assets data store; or configuring a video port for communicating video signals to the accessory.

11. The mobile computing device of claim 9 wherein the predictive analytics data store comprises correlation information between the set of commands likely to be invoked by the firmware version, the correlation information indicative of a temporal relationship among commands in the set of commands.

12. The mobile computing device of claim 11 wherein the correlation information comprises information about the first command and one or more other commands likely to follow the first command.

13. The mobile computing device of claim 12 wherein each of the one or more other commands has an associated weight, the weight indicative of a probability that each of the one or more other commands will be received next after the first command.

14. A method comprising:

receiving, by a mobile computing device from an accessory, identification information of the accessory;

analyzing, by the mobile computing device, the identification information to detect one or more characteristics indicative of firmware being executed by the accessory;

identifying, by the mobile computing device, the firmware being executed by the accessory based on the one or more characteristics;

determining, by the mobile computing device, based on a predictive analytics data tree associated with the firmware, a first command likely to be received next from the accessory; and retrieving, by the mobile computing device, from a media asset data store, media asset metadata to be sent in response to the first command, prior to receiving the first command.

15. The method of claim 14 wherein receiving the identification information from the accessory includes receiving a sequence of identification commands from the accessory and wherein the one or more characteristics comprise:

a specific order of information provided in the sequence of identification commands;

time between successive commands in the sequence of identification commands; or total time elapsed for receiving the sequence of identification commands.

16. The method of claim 14 further comprising:

after receiving the first command, determining two or more commands most likely to follow the first command;

determining information to be sent in response to the two or more commands;

determining a first common information to be sent in response to each of the two or more commands; and retrieving the first common information prior to any of the two or more commands being received from the accessory.

17. The method of claim 16 wherein determining the two or more commands most likely to follow the first command comprises querying the predictive analytics data tree that includes information identifying the two or more commands and the information to be sent in response to the two or more commands.

18. The method of claim 14 further comprising:
   determining a second command and a third command that are likely to follow the first command;
   determining a weight associated with each of the second command and the third command, the weight indicative of the probability that each of the second command and the third command will be received next following the first command;
   determining that the weight associated with the second command is higher than the weight associated with the third command; and
   retrieving information to be sent in response to the second command prior to receiving the second command.

19. A non-transitory computer readable storage medium including instructions which when executed by a processor in a mobile computing device, causes the processor to perform a method of communicating with an accessory, the method comprising:
   receiving a sequence of identification commands from the accessory;
   analyzing the sequence of identification commands to determine a characteristic indicative of a firmware for the accessory;
   determining, using a predictive analytics data store and the characteristic indicative of the firmware, a first command that is most likely to be received next from the accessory;
   determining an operation associated with the first command; and
   initiating the operation prior to the first command being received from the accessory.

20. The computer readable storage medium of claim 19 wherein determining the first command comprises:
   determining a current command received from the accessory;
   determining, using the predictive analytics data store, a set of commands that are likely to follow the current command; and
   determining the first command, from the set of commands, based on a weight associated with the first command.

21. The computer readable storage medium of claim 20 wherein the weight is a percentage value indicative of the likelihood that the first command will most likely be received next after the current command.

22. The computer readable storage medium of claim 19 wherein the predictive analytics data store comprises relationship information indicating a command that follows the first command and a command that precedes the first command.

23. The computer readable storage medium of claim 19 wherein the characteristic indicative of the firmware is one of:
   a specific order of information provided in the sequence of identification commands
   time between successive commands in the sequence of identification commands; or
   total time elapsed for receiving the sequence of identification commands.

24. A mobile computing device comprising:
   a memory including a first data store and a second data store, the first data store adapted to store information about commands supported by one or more firmware versions, wherein the information includes, for each firmware version:
      a first command used by the firmware version;
      a second command used by the firmware version; and
      information indicating a probability that the second command will follow the first command; and
   a processor configured to:
      determine a first firmware version being used by an accessory coupled to the mobile computing device;
      determine, based on the first firmware version, using the first data store, a command most likely to be received next from the accessory; and
      retrieve, from the second data store, information to be sent in response to the command most likely to be received next before receiving the command from the accessory.

25. The mobile computing device of claim 24 wherein the first data store further comprises a first weight indicative of a probability that the second command will follow the first command.

* * * * *